US012757091B2

(12) United States Patent
Kitagawa et al.

(10) Patent No.: US 12,757,091 B2
(45) Date of Patent: Oct. 6, 2026

(54) SYSTEM, METHOD, DEVICE, AND PROGRAM FOR INTERFACE MANAGEMENT OF AI/ML APPLICATIONS OVER RADIO ACCESS PARAMETERS

(71) Applicant: RAKUTEN MOBILE, INC., Tokyo (JP)

(72) Inventors: Koichiro Kitagawa, Tokyo (JP); Awn Muhammad, Tokyo (JP); Pankaj Shete, Tokyo (JP); Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 432 days.

(21) Appl. No.: 17/918,653

(22) PCT Filed: Aug. 10, 2022

(86) PCT No.: PCT/US2022/039910

§ 371 (c)(1),
(2) Date: Oct. 13, 2022

(87) PCT Pub. No.: WO2024/035399

PCT Pub. Date: Feb. 15, 2024

(65) Prior Publication Data

US 2024/0224148 A1 Jul. 4, 2024

(51) Int. Cl.
*H04W 36/22* (2009.01)
*H04L 41/16* (2022.01)
*H04W 76/27* (2018.01)

(52) U.S. Cl.
CPC ............ *H04W 36/22* (2013.01); *H04L 41/16* (2013.01); *H04W 76/27* (2018.02)

(58) Field of Classification Search
CPC ..... H04W 36/22; H04W 76/27; H04W 76/28; H04W 24/02; H04W 88/06; H04W 80/04;
(Continued)

(56) References Cited

U.S. PATENT DOCUMENTS 10,687,299 B2 6/2020 Adjakple et al.
2018/0121936 A1 * 5/2018 Madduri ............ G06Q 30/0201
(Continued)

FOREIGN PATENT DOCUMENTS

CN 114765771 A 7/2022
EP 3989630 A1 4/2022
(Continued)

OTHER PUBLICATIONS

Written Opinion dated Dec. 28, 2022 in International Application No. PCT/US22/39910.
(Continued)

*Primary Examiner* — Thuong Nguyen
(74) *Attorney, Agent, or Firm* — Sughrue Mion, PLLC

(57) ABSTRACT

A method for adaptive machine-learning related operation signaling in a telecommunication network may be provided. The method may be performed by at least one processor and may include detecting, by user device, a transition of the user device from a first state associated with a first 5G new radio protocol to a second state associated with the first 5G new radio protocol; in response to detecting the transition, transmitting, by the user device, first information associated with the transition; receiving, by the user device, change information associated with a target operation, wherein the change information is based on the first information transmitted by the user device; and performing, by the user device, the target operation based on the change information.

15 Claims, 5 Drawing Sheets

(58) Field of Classification Search
CPC ......... H04W 72/1273; H04W 72/0446; H04W 72/042; H04W 72/0453; H04W 72/121; H04W 72/1268; H04W 56/005; H04W 74/0833; H04W 74/0808; H04L 41/16; H04L 41/0816; H04L 41/34; G06N 20/00
USPC .......................................................... 370/331
See application file for complete search history.

(56) References Cited

U.S. PATENT DOCUMENTS

| | | | | |
|---|---|---|---|---|
| 2018/0206262 | A1* | 7/2018 | Cao | H04W 56/0045 |
| 2018/0310192 | A1* | 10/2018 | Bergquist | H04L 1/1848 |
| 2019/0246445 | A1* | 8/2019 | Centonza | H04W 76/27 |
| 2019/0294967 | A1* | 9/2019 | Kumar | G06N 3/0499 |
| 2019/0373593 | A1* | 12/2019 | Patil | H04W 72/51 |
| 2020/0351944 | A1* | 11/2020 | Wang | H04W 74/0808 |
| 2021/0092583 | A1 | 3/2021 | Cui et al. | |
| 2021/0105332 | A1* | 4/2021 | Bellet | H04L 67/54 |
| 2021/0142000 | A1* | 5/2021 | Vis | G06F 40/169 |
| 2022/0007397 | A1* | 1/2022 | Liu | H04L 5/0094 |
| 2022/0028517 | A1* | 1/2022 | Neumann | G16H 50/20 |
| 2022/0038349 | A1 | 2/2022 | Li et al. | |
| 2022/0104033 | A1* | 3/2022 | Ly | H04L 67/01 |
| 2022/0107852 | A1* | 4/2022 | Kulkarni | G06N 5/02 |
| 2022/0108026 | A1* | 4/2022 | Ortiz | G06F 12/1408 |
| 2022/0391732 | A1* | 12/2022 | Baudel | G06N 5/045 |
| 2022/0405686 | A1* | 12/2022 | Ding | G06Q 10/063112 |
| 2023/0027027 | A1* | 1/2023 | Ganesan | G06Q 30/0282 |
| 2023/0108469 | A1* | 4/2023 | Le | G06F 18/2321 709/206 |
| 2023/0188253 | A1* | 6/2023 | Matsuda | H04L 1/0041 370/328 |
| 2023/0195842 | A1* | 6/2023 | Bouadi | G06F 18/214 382/159 |
| 2023/0262648 | A1* | 8/2023 | Thomas | H04W 64/00 455/456.1 |
| 2023/0308920 | A1* | 9/2023 | Manolakos | H04W 24/10 |
| 2024/0048977 | A1* | 2/2024 | Marzban | G06N 20/20 |
| 2024/0214988 | A1* | 6/2024 | Shrivastava | H04W 76/27 |
| 2024/0224148 | A1* | 7/2024 | Kitagawa | H04W 24/02 |
| 2024/0373276 | A1* | 11/2024 | Yue | H04W 74/0833 |

FOREIGN PATENT DOCUMENTS

| | | | |
|---|---|---|---|
| WO | 2020/041883 | A1 | 3/2020 |
| WO | 2021/219201 | A1 | 11/2021 |
| WO | 2022/083929 | A1 | 4/2022 |

OTHER PUBLICATIONS

International Search Report dated Dec. 28, 2022 in International Application No. PCT/US22/39910.

* cited by examiner 200
205
Detect a Transition of UE from First State to Second State
210
Transmit First Information Associated With The Transition
215
Receive Change Information Associated With a Target Operation Based on First Information
220
Performing The Target Operation Based on The Change Information

SYSTEM, METHOD, DEVICE, AND PROGRAM FOR INTERFACE MANAGEMENT OF AI/ML APPLICATIONS OVER RADIO ACCESS PARAMETERS

This Application is a National Stage of International Application No. PCT/US2022/39910 filed Aug. 10, 2022.

FIELD OF THE INVENTION

The present disclosure relates to management of artificial intelligence and machine-learning (AI/ML) models using radio access parameters and interfaces. In particular, the present disclosure relates to a method, apparatus, and system for adaptive machine-learning related operation(s) signaling in a telecommunication network and/or wireless network.

BACKGROUND OF THE INVENTION

In a telecommunication network, a plurality of functions performed by the components of the telecommunication network may be optimized using AI/ML modelling. While there are some discussions around using AI/ML models to optimize some functions of the telecommunication network, those discussions may be focused on application framework, model evaluation, etc. However, there are no existing standards or discussions relating to the use of specific radio access parameters, new radio protocols, and/or interfaces for management of AI/ML models. For example, there are no discussions relating to specific radio access parameters, new radio protocols, and/or interfaces that may be used to signal collaboration information, user device capability information, or other parameters affecting the real-time application of the optimized AI/ML models in the telecommunication network.

In other words, there are no discussions and/or consensus relating to managing AI/ML models and their application in the telecommunication network. More specifically, there is no discussion and/or standard associated with signaling a dynamic application of AI/ML functionality using radio access parameters. This absence of signaling guidance may result in ineffective leveraging of AI/ML modelling in the telecommunication network and increase the latency and inefficiency of the telecommunication network.

Therefore, to effectively leverage and dynamically manage AI/ML usage in the telecommunication network, there is a need to define which radio access parameters, the new radio protocols, and/or new radio interfaces may be used.

SUMMARY

According to embodiments, a method for adaptive machine-learning related operation signaling in a telecommunication network. The method may be performed by at least one processor and may include detecting, by user device, a transition of the user device from a first state associated with a first 5 G new radio protocol to a second state associated with the first 5G new radio protocol; in response to detecting the transition, transmitting, by the user device, first information associated with the transition; receiving, by the user device, change information associated with a target operation, wherein the change information is based on the first information transmitted by the user device; and performing, by the user device, the target operation based on the change information.

According to an aspect, the first information may include a machine-learning collaboration level change request associated with the user device, and the change information may include at least one of an acknowledgement of the machine-learning collaboration level change request or a new machine-learning collaboration level based on the machine-learning collaboration level change request.

According to an aspect, the change information may further be based on at least one of a type of the target operation, a time sensitivity of the target operation, and a criticality associated with the target operation.

According to an aspect, performing the target operation may include one of: based on the new machine-learning collaboration level being a first level, performing the target operation based on received assistance information associated with the target operation, wherein the received assistance information may be based on one or more machine-learning models associated with the target operation; based on the new machine-learning collaboration level being a second level, performing the target operation without the received assistance information associated with the target operation; and based on the new machine-learning collaboration level being a third level, terminating the target operation at the user device.

According to an aspect, the first state may be one of a RRC idle state or a RRC inactive state and the second state may be a RRC connected state, and the change information may include an indication of a machine-learning collaboration level based on one or more capabilities of the user device.

According to an aspect, the first state may be a Radio Resource Control (RRC) connected state and the second state may be one of a RRC idle state or a RRC inactive state, and the change information may include a new machine-learning collaboration level based on the transition.

According to an aspect, the first 5G new radio protocol may be associated with radio resource control layer.

According to an aspect, based on the target operation being associated with a real-time application, information exchange may be signaled using one or more physical layer protocols. Information exchange may include transmitting the first information and receiving the change information.

According to an aspect, based on the target operation being associated with a near real-time application, information exchange may be signaled using one or more physical layer protocols, non-access stratum layer protocols, and radio resource control layer protocols.

According to an aspect, based on the target operation being associated with a non-real-time application, information exchange may be signaled using one or more non-access stratum layer protocols and radio resource control layer protocols.

According to embodiments, an apparatus for adaptive machine-learning related operation signaling in a telecommunication network may be provided. The apparatus may include at least one memory configured to store computer program code; and at least one processor configured to access the computer program code and operate as instructed by the computer program code. The program code may include detecting code configured to cause the at least one processor to detect a transition of the user device from a first state associated with a first 5G new radio protocol to a second state associated with the first 5G new radio protocol; transmitting code configured to cause the at least one processor to transmit, in response to detecting the transition, first information associated with the transition; receiving code configured to cause the at least one processor to receive change information associated with a target operation, wherein the change information is based on the first information transmitted by the user device; and performing code configured to cause the at least one processor to perform the target operation based on the change information.

According to embodiments, a non-transitory computer readable medium storing instructions for adaptive machine-learning related operation signaling in a telecommunication network may be provided. The instructions comprising: one or more instructions that, when executed by one or more processors, may cause the one or more processors to detect, by user device, a transition of the user device from a first state associated with a first 5G new radio protocol to a second state associated with the first 5G new radio protocol; in response to detecting the transition, transmit, by the user device, first information associated with the transition; receive, by the user device, change information associated with a target operation, wherein the change information is based on the first information transmitted by the user device; and perform, by the user device, the target operation based on the change information.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

Figure 1:
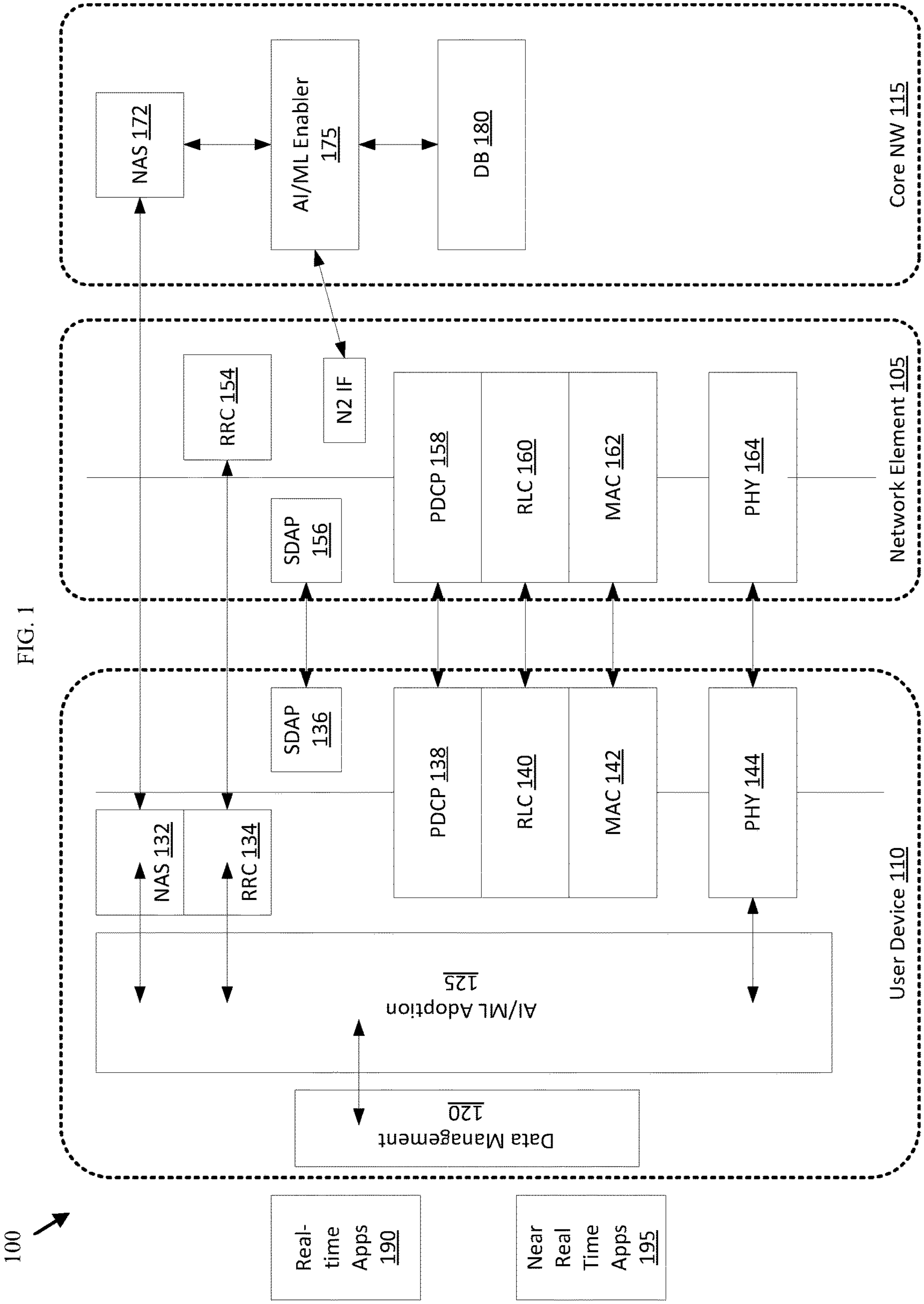
FIG. 1 is an example diagrammatic illustration of a network architecture in which the systems and/or methods described in the present disclosure may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

As stated above, there are no existing standards or even discussions relating to the use of specific radio access parameters, new radio protocols, and/or interfaces for management of AI/ML models. For example, there are no discussions relating to specific radio access parameters, new radio protocols, and/or interfaces that may be used to signal collaboration information, user device capability information, or other parameters affecting the real-time application of the optimized AI/ML models in the telecommunication network.

In other words, there are no discussions and/or consensus relating to managing AI/ML models and their application in the telecommunication network. More specifically, there is no discussion and/or standard associated with signaling a dynamic application of AI/ML functionality using radio access parameters. This absence of signaling guidance may result in ineffective leveraging of AI/ML modelling in the telecommunication network and increase the latency and inefficiency of the telecommunication network. Therefore, to effectively leverage and dynamically manage AI/ML usage in the telecommunication network, there is a need to define which radio access parameters, the new radio protocols, and/or new radio interfaces may be used.

According to aspects of the present disclosure, AI/Ml models may be dynamically managed and applied to perform target operations using appropriate radio access parameters, new radio protocols, and/or interfaces. Appropriate radio access parameters, new radio protocols, and/or interfaces may be based on one or more capabilities of the user device, the type and properties of the target operation, the time sensitivity and priority of the target operation, and/or a change of state relating to the connection of the user device with the telecommunication network.

According to aspects of the present disclosure, the user device may communicate with the telecommunication network via network elements and dynamically manage AI/Ml models associated with a target operation being performed by the user device. An AI/ML adoption function may be defined that may enable the user device to adaptively and in real time control the AI/ML models deployed at the user device using radio access parameters and interfaces depending on one or more capabilities of the user device, the type and properties of the target operation, the time sensitivity and priority of the target operation, and/or a change of state relating to the connection of the user device with the telecommunication network.

In some embodiments, the AI/ML adoption function may interface with a plurality of layers in the 5G new radio protocol stack. As an example, the AI/ML adoption function may interface with the Radio Resource Control (RRC) layer, Non-Access Stratum (NAS) layer, and/or the Physical layer (PHY) of the 5G new radio protocol stack.

According to aspects of the present disclosure, the AI/ML adoption function may be used to determine a machine-learning collaboration level associated with the user device. The machine-learning collaboration level associated with the user device may indicate whether an AI/ML model associated with an operation may need additional information from the telecommunication network or may be implemented on the user device without additional information from the telecommunication network. The machine-learning collaboration level associated with the user device may be changed in response to a change in a connection state of the user device. As an example, if the user device is in "sleep mode" the connection between the user device and the network element may be inactive or idle. In some embodiments, the changing of the connection state to idle or inactive the machine-learning collaboration level associated with the user device may be changed and one or more of the AI/ML models may be deployed at the network element or the core network. Based on the connection state changing and the connection between the user device and network element resuming, the machine-learning collaboration level associated with the user device may be changed and one or more of the AI/ML models may be deployed at the user device. The machine-learning collaboration level associated with the user device or the changed machine-learning collaboration level associated with the user device may be signaled using the RRCResumeRequestl, RRCResumeRequest, RRCReconfiguration, and/or RRCRelease messages.

In some embodiments, the AI/ML adoption function may be used to determine a machine-learning capability level associated with the user device. The machine-learning capability level associated with the user device may indicate whether an AI/ML model associated with an operation may be trained, updated, and/or deployed on the user device. The machine-learning capability level associated with the user device may be changed in response to a change in a connection state of the user device. As an example, if the user device is in "sleep mode" the connection between the user device and the network element may be inactive or idle. In some embodiments, the changing of the connection state to idle or inactive the machine-learning capability level associated with the user device may be changed and one or more of the AI/ML models may be deployed at the network element or the core network. Based on the connection state changing and the connection between the user device and network element resuming, the machine-learning capability level associated with the user device may be changed and one or more of the AI/ML models may be deployed at the user device. The machine-learning capability level associated with the user device or the changed machine-learning capability level associated with the user device may be signaled using the RRCResumeRequestl, RRCResumeRequest, RRCReconfiguration, and/or RRCRelease messages.

According to aspects of the present disclosure, the AI/ML adoption function may interface and/or communicate with the telecommunication network using one or more of the RRC layer, NAS layer, or PHY layer of the 5G new radio protocol stack. In some embodiments, the NAS layer may be used to transmit and/or receive information associated with the user device type, user device properties, slice type information, positioning information of the user device, time sensitivity information, etc. The NAS layer may also be used to transmit one or more of the user device capabilities to the telecommunication network. In some embodiments, the RRC layer may be used to transmit and/or receive user device connectivity with the telecommunication network. Based on a connection state of the user device with the telecommunication network or based on a change in the connection state of the user device with the telecommunication network, the AI/ML model may be trained, updated, and/or deployed on the user device.

FIG. 1 is an exemplary diagrammatic illustration of a snippet of a network architecture in which the systems and/or methods described in the present disclosure may be implemented.

As shown in FIG. 1, the network infrastructure 100 of a telecommunication network may include one or more user device 110, one or more network element 105, and a core network 115.

According to embodiments, user device 110 may be any device used by an end-user to communicate using the telecommunication network. The user device 110 may communicate with the network element 105 through a radio channel. The user device 110 may be replaced by a 'terminal', 'user equipment (UE)', a 'mobile station', a 'subscriber station', customer premises equipment (CPE)∝, a 'remote terminal', a 'wireless terminal', a 'user device', 'device,' 'laptop,' 'computing device,' or other terms having the technical meaning equivalent thereto.

In some embodiments, the user device 110 may include a plurality of 5G new radio layers and/or protocol stacks. As an example, the user device 110 may comprise the NAS layer 132, RRC layer 134, Service Data Adaptation Protocol (SDAP) 136, Packet Data Convergence Protocol (PDCP) 138, Radio Link Control (RLC) layer 140, Medium Access Control (MAC) layer 142, and the PHY layer 144. According to an embodiment, the user device 110 may include a data management function 120 and a AI/ML adoption function 125.

According to aspects of the present disclosure, the user device may communicate with the telecommunication network via network elements and dynamically manage AI/Ml models associated with a target operation being performed by the user device. An AI/ML adoption function 125 may be defined that may enable the user device to adaptively and in real time control the AI/ML models deployed at the user device using radio access parameters and interfaces depending on one or more capabilities of the user device, the type and properties of the target operation, the time sensitivity and priority of the target operation, and/or a change of state relating to the connection of the user device with the telecommunication network.

In some embodiments, the AI/ML adoption function 125 may interface with a plurality of layers in the 5G new radio protocol stack. As an example, the AI/ML adoption function may interface with the RRC layer 134, NAS layer 132, and/or the PHY layer 144 of the 5G new radio protocol stack.

According to aspects of the present disclosure, the AI/ML adoption function 125 may be used to determine a machine-learning collaboration level associated with the user device. The machine-learning collaboration level associated with the user device may indicate whether an AI/ML model associated with an operation may need additional information from the telecommunication network or may be implemented on the user device without additional information from the telecommunication network. The machine-learning collaboration level associated with the user device may be changed in response to a change in a connection state of the user device. As an example, if the user device is in "sleep mode" the connection between the user device 110 and the network element 105 may be inactive or idle. In some embodiments, the changing of the connection state to idle or inactive the machine-learning collaboration level associated with the user device may be changed and one or more of the AI/ML models may be deployed at the network element 105 or the core network 115. Based on the connection state changing and the connection between the user device 110 and network element 105 resuming, the machine-learning collaboration level associated with the user device 110 may be changed and one or more of the AI/ML models may be deployed at the user device 110.

In some embodiments, the AI/ML adoption function 125 may be used to determine a machine-learning capability level associated with the user device 110. The machine-learning capability level associated with the user device may indicate whether an AI/ML model associated with an operation may be trained, updated, and/or deployed on the user device 110. The machine-learning capability level associated with the user device may be changed in response to a change in a connection state of the user device 110. As an example, if the user device 110 is in "sleep mode" the connection between the user device 110 and the network element 105 may be inactive or idle. In some embodiments, the changing of the connection state to idle or inactive the machine-learning capability level associated with the user device 110 may be changed and one or more of the AI/ML models may be deployed at the network element 105 or the core network 115. Based on the connection state changing and the connection between the user device 110 and network element 105 resuming, the machine-learning capability level associated with the user device 110 may be changed and one or more of the AI/ML models may be deployed at the user device 110.

According to an embodiment of the present disclosure, the user device 110 may include a data management function 120. The data management function 120 may interface with the AI/ML adoption function 125. The data management function 125 may collect and share information associated with one or more AI/ML models. In some embodiments, the data management function 120 may selectively share information for one or more applications, operations, and/or functionalities of the telecommunication network being performed using AI/Ml modeling.

In some embodiments, the user device 110 may communicate with the telecommunication network using network element 105 such as a base station. An example of a base station may be gNodeB or an eNodeB. The network element 105 may be a node that enables communication between a user device 110 and the telecommunication system using a radio channel. The network element 105 may be a network infrastructure component, which may provide a wireless connection to the user device 110. The network element 105 may have a coverage defined as a certain geographical region also known as a sector based on a signal transmittable distance.

The network element 105 may include a plurality of 5G new radio layers and/or protocol stacks. As an example, the network element 105 may include RRC layer 154, SDAP layer 156, PDCP 158, RLC layer 160, MAC layer 162, and PHY layer 164.

The NAS layer 132 and NAS layer 172 may be used to determine the positioning of the user device 110 at the user device 110 and the core network 115 respectively. In some embodiments, the AI/ML adoption function 125 may interface with NAS layer 132 and transmit and/or receive user device type, user device properties, slice type information, indoor positioning of the user device, time sensitivity information associated with one or more target operations being performed using AI/ML models. In some embodiments, NAS layer 132 may be used to interface with AI/ML models being used to perform the target operation, wherein the target operations may include but not be limited to operations associated with model transfers, control for normal time optimization, user device AI/ML capability, user device AI/ML collaboration level, user device type and properties, user device positioning, etc.

The RRC layer 134 and RRC layer 154 may be used to determine where the AI/ML models may reside and/or be executed. In some embodiments, the AI/ML adoption function 125 may interface with RRC layer 134 and transmit and/or receive the connectivity status between the user device 110 and the network element 105. In some embodiments, RRC layer 134 may be used to interface with AI/ML models being used to perform the target operation, wherein the target operations may include but not be limited to operations associated with model transfers, control for near-real-time optimization, control for normal time optimization, key performance indicator monitoring, tuning parameters associated with the device, user device AI/ML capability, user device AI/ML collaboration level, user device positioning, etc.

The PHY layer 144 and PHY layer 164 may be used to set, exchange, and signal radio control parameters associated with configuration of the radio communication between the user device 110 and the telecommunication network—the network element 105 and/or the core network 115. In some embodiments, the AI/ML adoption function 125 may interface with PHY layer 144 and transmit and/or receive the parameters associated with establishing and/or tuning the connection between the user device 110 and the network element 105 or core network 115. In some embodiments, PHY layer 144 may be used to interface with AI/ML models being used to perform the target operation, wherein the target operations may include but not be limited to operations associated with model transfers, control for real-time optimization, control for normal time optimization, user device AI/ML capability, user device AI/ML collaboration level, user device positioning, etc.

According to embodiments, the SDAP layer 136 and SDAP layer 156 may be used for quality of service and flow handling between the user device 110 and the network element 105. In some embodiments, SDAP layer 136 may be used to interface with AI/ML models being used to perform the target operation, wherein the target operations may include but not be limited to operations associated with quality of service and flow handling.

According to embodiments, the PDCP layer 138 and PDCP layer 158 may be used for packet compression, ciphering, maintaining data integrity between the user device 110 and the network element 105. In some embodiments, PDCP layer 138 may be used to interface with AI/ML models being used to perform the target operation, wherein the target operations may include but not be limited to operations associated with packet compression, ciphering, maintaining data integrity.

According to embodiments, the RLC layer 140 and RLC layer 160 may be used for error correction, sequence numbering, segmentation, and de-duplication between the user device 110 and the network element 105. In some embodiments, RLC layer 140 may be used to interface with AI/ML models being used to perform the target operation, wherein the target operations may include but not be limited to operations associated with error correction, sequence numbering, segmentation, and de-duplication.

According to embodiments, the MAC layer 142 and MAC layer 162 may be used for mapping between logical channels and transport channels, multiplexing, de-multiplexing, scheduling, HARQ optimization, etc. In some embodiments, MAC layer 142 may be used to interface with AI/ML models being used to perform the target operation, wherein the target operations may include but not be limited to operations associated with mapping between logical channels and transport channels, multiplexing, de-multiplexing, scheduling, HARQ optimization.

In some embodiments, network infrastructure 100 may include a core network 115. The core network 115 may include an AI/ML enabler 175 and one or more databases 180. The AI/ML enabler 175 may communicate with the network element 105 using N1 protocol and/or interface. The AI/ML enabler 175 may communicate with the user device 110 using N2 protocol and/or interface. The AI/ML enabler 175 may store AI/ML models that may be used to perform one or more operations and/or functionalities of the telecommunication network. The databases 180 may store data associated with the AI/ML model's training, testing, and validation. The databases 180 may transmit data to and/or receive data from the AI/ML enabler 175.

According to an embodiment of the disclosure, the network infrastructure 100 may include one or more real-time applications 190 and one or more near-real-time applications 195. According to an aspect of the present disclosure, the AI/ML adoption function 125 may select one or more interfaces to exchange information associated with the AI/ML models and/or the one or more operations being performed at the user device based on a type of the application. As an example, for real-time applications using AI/ML models, information exchange associated with the real-time application and/or the AI/ML models may be signaled using one or more physical layer protocols. As an example, for near-real-time applications using AI/ML models, information exchange associated with the near-real-time application and/or the AI/ML models may be signaled sing one or more physical layer protocols, non-access stratum layer protocols, and radio resource control layer protocols. As an example, for non-real-time applications using AI/ML models, information exchange associated with the near-real-time application and/or the AI/ML models may be signaled sing one or more non-access stratum layer protocols, and radio resource control layer protocols.

Figure 2:
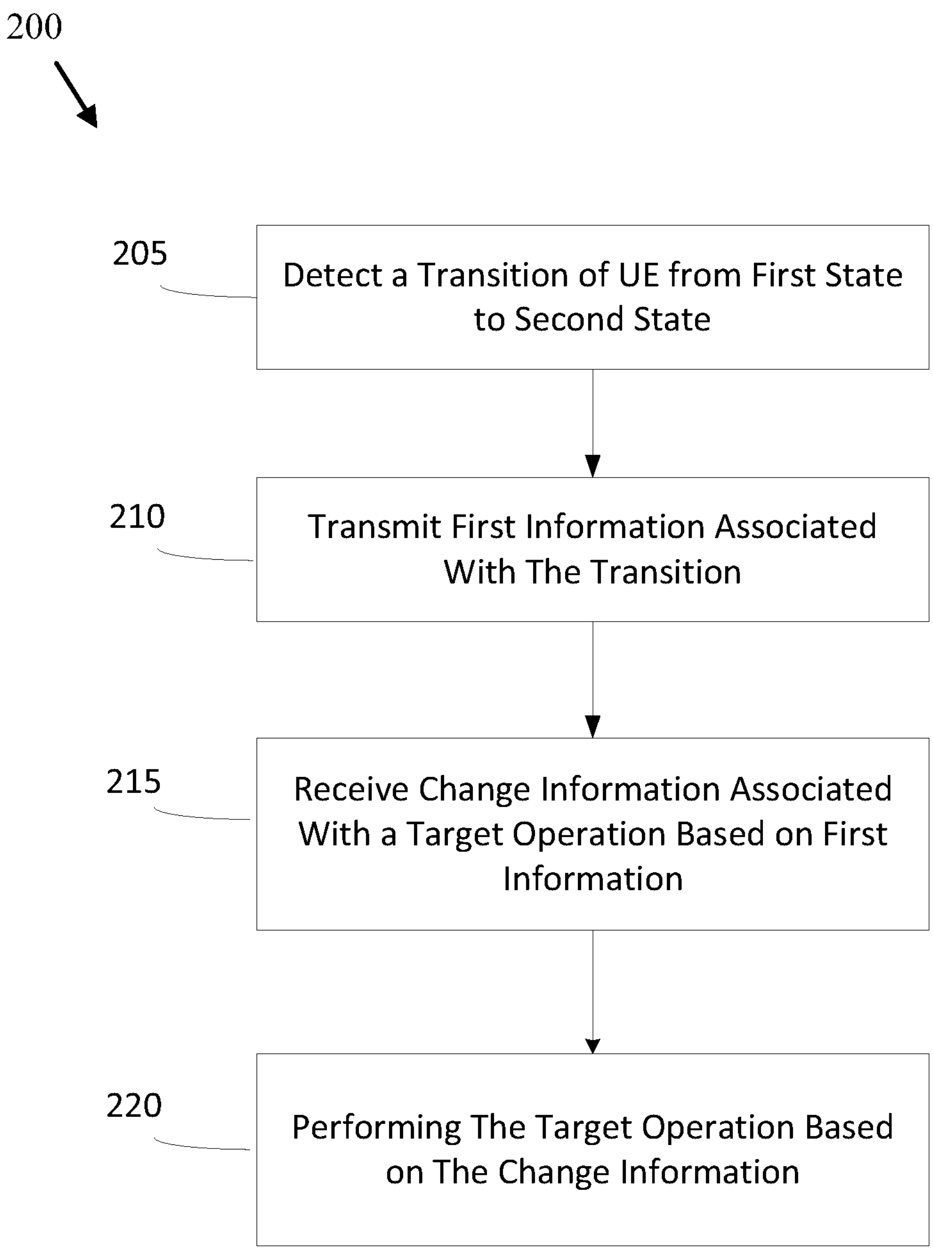
FIG. 2 is an example flowchart illustrating an example process for adaptive machine-learning related operation signaling in a telecommunication network, according to embodiments of the present disclosure.

FIG. 2 is an example flowchart illustrating an example process 200 for adaptive machine-learning related operation signaling in a telecommunication network, according to embodiments of the present disclosure.

Figure 5:
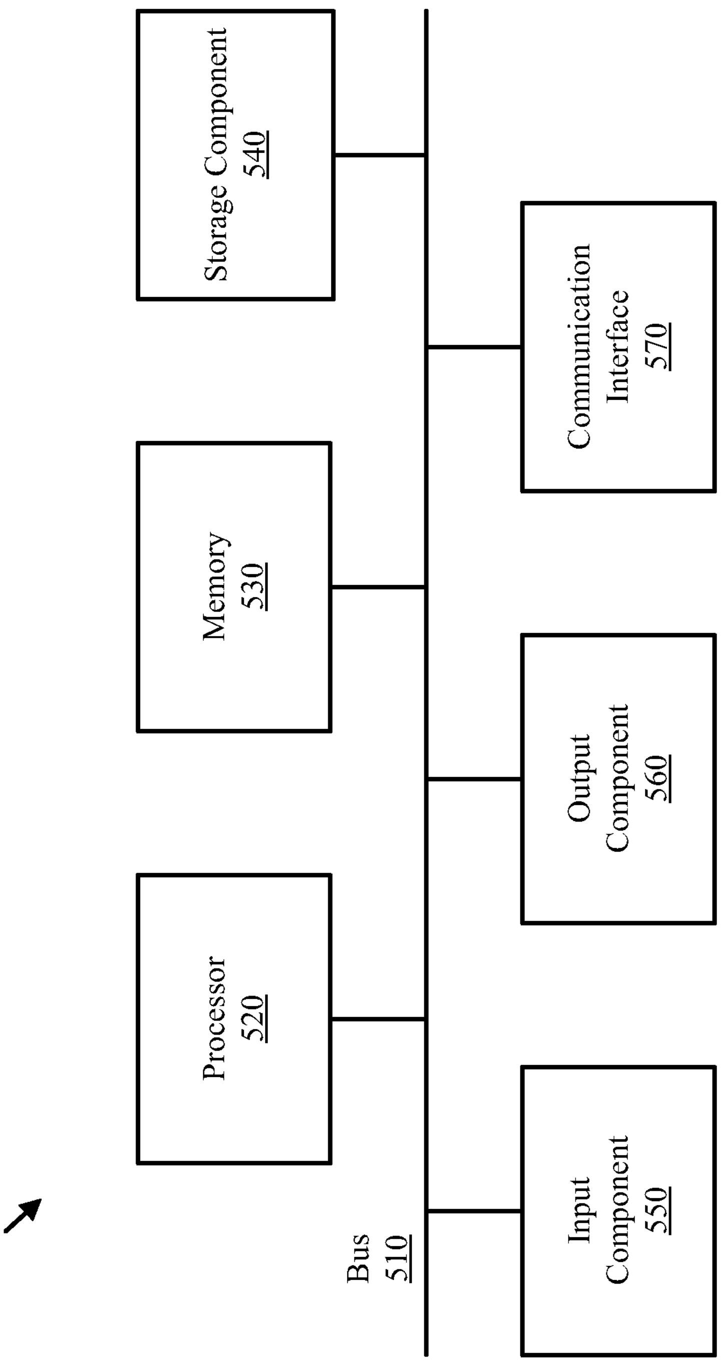
FIG. 5 is an example diagrammatic illustration of a component of the network architecture of FIG. 1, according to embodiments of the present disclosure.

As shown in FIG. 2, one or more process blocks of processes 200 may be performed by any of the components of FIGS. 1 and 5-6 discussed in the present application. In FIG. 2, one or more process blocks of processes 200 may correspond to the operations associated with the user device 110.

At operation 205, the user device may detect a transition of the user device from a first state associated with a first 5G new radio protocol to a second state associated with the first 5G new radio protocol. As an example, the first state and the second state may include a RRC connected state, a RRC idle state, and a RRC inactive state. The first 5G new radio protocol may include the RRC layer, the NAS layer, and/or the PHY layer.

In an embodiment of the present disclosure, at operation 210, in response to detecting the transition, the user device may transmit first information associated with the transition.

In an embodiment of the present disclosure, the first information may include a machine-learning collaboration level change request associated with the user device or one or more capabilities of the user device.

At operation 215, the user device may receive change information associated with a target operation from the network element 105 and/or core network 115. The change information may be based on the first information transmitted by the user device.

In some embodiments, the change information may include at least one of an indication of a machine-learning collaboration level based on one or more capabilities of the user device, an acknowledgement of the machine-learning collaboration level change request or a new machine-learning collaboration level based on the machine-learning collaboration level change request or the transition. Further, in some embodiments, the change information may be further based on at least one of a type of the target operation, a time sensitivity of the target operation, and a criticality associated with the target operation.

At operation 220, the user device may perform the target operation based on the change information. According to an aspect, based on the change information including a machine-learning collaboration level associated with the user device the target operation may be performed using AI/ML models and/or information from the network element. In some embodiments, based on the new machine-learning collaboration level being a first level, performing the target operation may be based on received assistance information associated with the target operation, and the received assistance information may be based on one or more machine-learning models associated with the target operation. In some embodiments, based on the new machine-learning collaboration level being a second level, performing the target operation may not be based on received assistance information associated with the target operation. In some embodiments, based on the new machine-learning collaboration level being a third level, terminating the target operation at the user device.

According to an aspect of the present disclosure, information exchange between the user device and the network element and/or the core network including transmitting the first information and receiving the change information may be signaled using a specific 5G new radio protocol based on the application associated with the target operation. As an example, based on the target operation being associated with a real-time application, the information exchange may be signaled using one or more physical layer protocols. As an example, based on the target operation being associated with a near-real-time application, the information exchange may be signaled using one or more physical layer protocols, non-access stratum layer protocols, and radio resource control layer protocols. As an example, based on the target operation being associated with a non-real-time application, the information exchange may be signaled using one or more non-access stratum layer protocols and radio resource control layer protocols.

Figure 3:
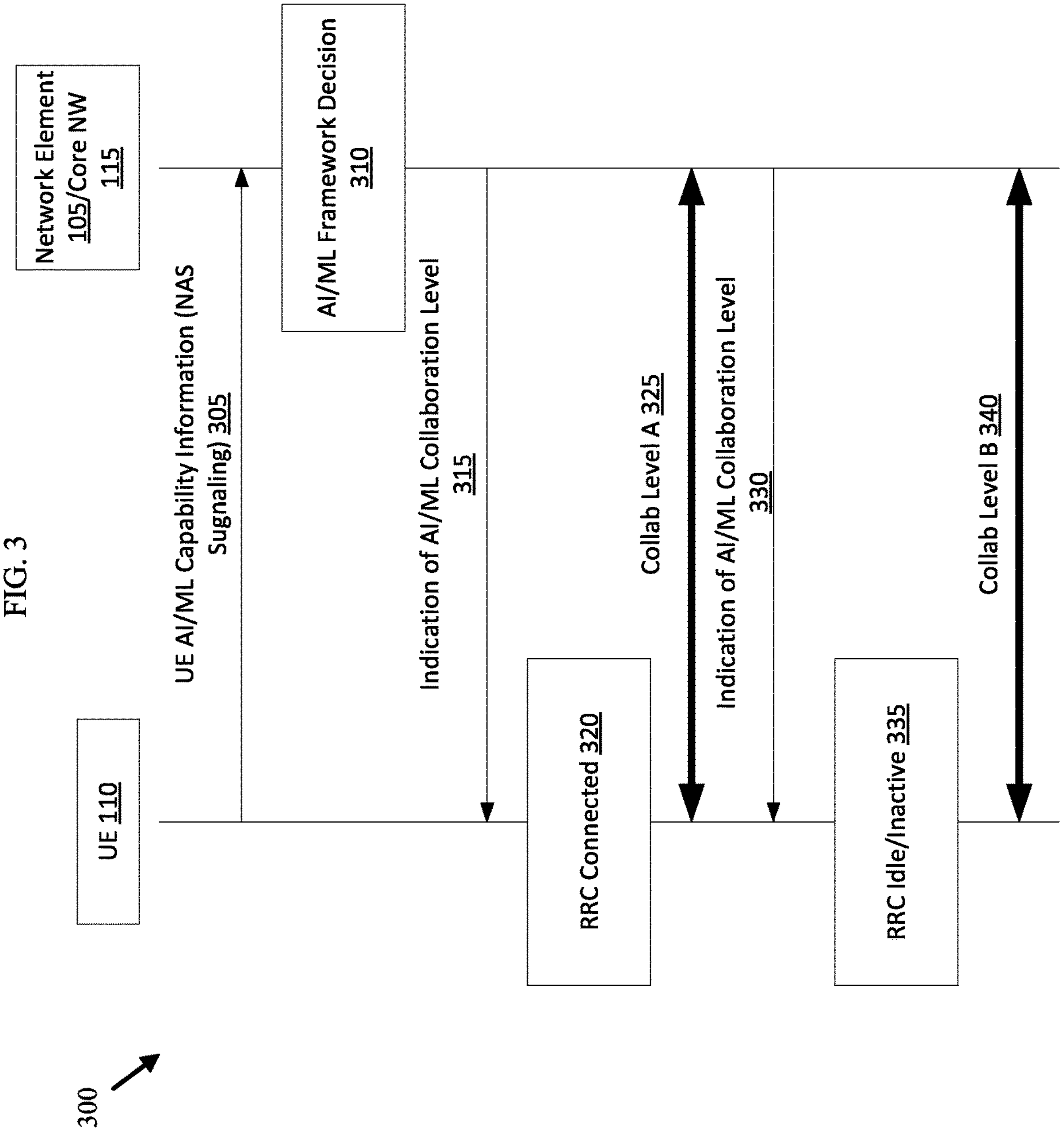
FIG. 3 is an example workflow diagram illustrating an example process for adaptive machine-learning related operation signaling in a telecommunication network, according to embodiments of the present disclosure.

FIG. 3 is an example workflow diagram illustrating an example workflow 300 for adaptive machine-learning related operation signaling in a telecommunication network, according to embodiments of the present disclosure.

Figure 4:
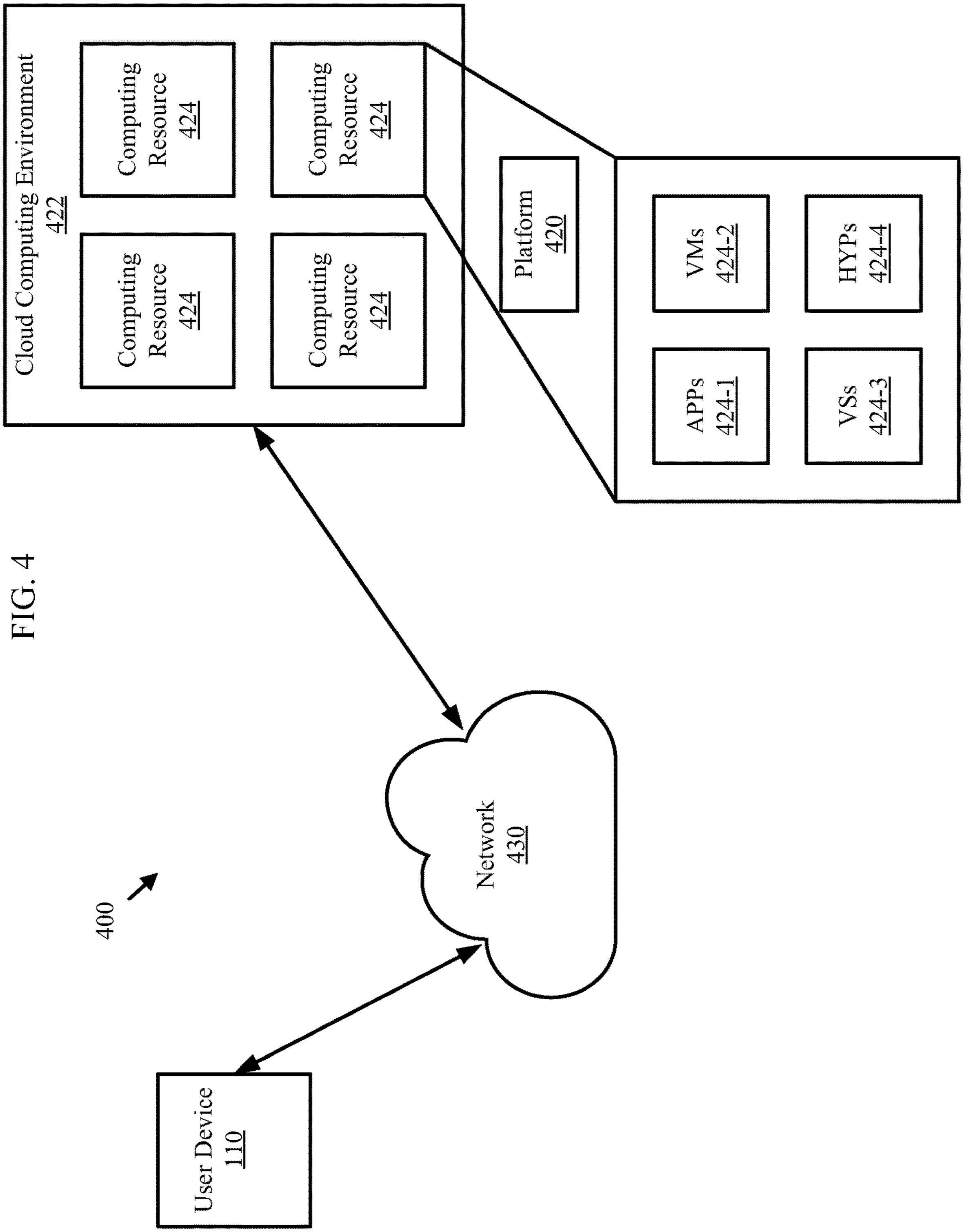
FIG. 4 is an example diagrammatic illustration of a component of the network architecture of FIG. 1, according to embodiments of the present disclosure.

As shown in FIG. 3, one or more operation blocks of workflow 300 may be performed by any of the components of FIGS. 1 and 4-5 discussed in the present application. In FIG. 3, one or more process blocks of processes 300 may correspond to the operations associated with the user device 110, network element 105, and/or core network 115.

At operation 305, the user device 110 may transmit, to the network element 105, and/or core network 115, one or more user device capabilities. In some embodiments the user device 110 may use the NAS layer 132 to signal the user device capabilities.

At operation 310, the AI/ML framework may determine machine-learning collaboration level and/or the machine-learning capability level associated with the user device based on the user device capabilities. In some embodiments, the AI/ML framework may determine, at the network element 105, and/or core network 115, the machine-learning collaboration level and/or the machine-learning capability level associated with the user device. At operation 315, the network element 105, and/or core network 115 may transmit an indication of the machine-learning collaboration level and/or the machine-learning capability level associated with the user device to the user device 105. In some embodiments, the indication of the machine-learning collaboration level and/or the machine-learning capability level associated with the user device may be signaled using the RRCReconfiguration message.

At operation 320, a connection state of the user device 110 may change to a connected state, and may, at operation 325, enable the user device 110 to perform a target operation, e.g., indoor positioning of the user device 110, in complete collaboration with the network element 105, and/or core network 115.

At operation 330, the network element 105 or the core network 115 may transmit an indication of a change in the machine-learning collaboration level and/or a of a change in the machine-learning capability level associated with the user device using the RRCRelease message. The change in the machine-learning collaboration level and the change in the machine-learning capability level associated with the user device may be examples of change information.

Based on the change information received at operation 330, at operation 335, a connection state of the user device 110 may change to a idle state or inactive state from a connected state. At operation 340, the user device 110 may be enabled to perform a target operation, e.g., indoor positioning of the user device 110, in without any additional collaboration with the network element 105, and/or core network 115, i.e., in standalone mode.

FIG. 4 is a diagram of an example environment for implementing one or more devices, operations, and/or frameworks of FIGS. 1-3.

As shown in FIG. 4, environment 400 may include a user device 110, a platform 420, and a network 430. Devices of environment 400 may interconnect via wired connections, wireless connections, or a combination of wired and wireless connections. In embodiments, any of the functions of the elements included in network infrastructure 100 may be performed by any combination of elements illustrated in FIG. 4. For example, in embodiments, user device 110 may perform one or more functions associated with a personal computing device, and platform 420 may perform one or more functions associated with any of the network element 105.

The user device 110 may include one or more devices capable of receiving, generating, and storing, processing, and/or providing information associated with platform 420. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device. In some implementations, the user device 110 may receive information from and/or transmit information to platform 420.

Platform 420 may include one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 is not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc. services that do not require end-user (e.g., user device 110) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 110 or the network element 105. Application 424-1 may eliminate a need to install and execute the software applications on user device 110 or the network element 105. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 110), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

FIG. 5 is a diagram of example components of one or more devices of FIGS. 1-4, according to embodiments of the present disclosure.

According to one embodiment, FIG. 5 may be diagram of example components of a user device 110. The user device 110 may correspond to a device associated with an authorized user, an operator of a cell, or a RF engineer. The user device 110 may be used to communicate with cloud platform 420 via the network element 105. As shown in FIG. 5, the user device 110 may include a bus 510, a processor 520, a memory 530, a storage component 540, an input component 550, an output component 560, and a communication interface 570.

Bus 510 may include a component that permits communication among the components of the user device 110. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of the user device 110. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits the user device 110 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from the user device 110 (e.g., a display, a speaker, and/or one or more light-emitting diodes (LEDs)).

Communication interface 570 includes a transceiver-like component (e.g., a transceiver and/or a separate receiver and transmitter) that enables the user device 110 to communicate with other devices, such as via a wired connection, a wireless connection, or a combination of wired and wireless connections. Communication interface 570 may permit the user device 110 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

The user device 110 may perform one or more processes described herein. The user device 110 may perform these processes in response to processor 520 executing software instructions stored by a non-transitory computer-readable medium, such as memory 530 and/or storage component 540. A computer-readable medium may be defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for adaptive machine-learning related operation signaling in a telecommunication network, the method being performed by one or more processors, the method comprising:

detecting, by user device, a transition of the user device from a first state associated with a first 5G new radio protocol to a second state associated with the first 5G new radio protocol;

in response to detecting the transition, transmitting, by the user device, first information associated with the transition, wherein the first information comprises a machine-learning collaboration level change request associated with the user device, the machine-learning collaboration level change request being a request to change a machine-learning collaboration level from among a plurality of predetermined machine-learning collaboration levels indicating whether or not a target operation is performed using a machine-learning model at a network node; and receiving, by the user device in response to the transmitted first information, change information associated with the target operation, wherein the change information indicates the machine-learning collaboration level that varies based on the first information transmitted by the user device, wherein the target operation is performed based on the indicated machine-learning collaboration level, wherein the change information comprises at least one of an acknowledgement of the machine-learning collaboration level change request or a new machine-learning collaboration level based on the machine-learning collaboration level change request, and wherein performing the target operation based on the indicated machine-learning collaboration level comprises:

based on the new machine-learning collaboration level being changed to a first level in response to the detected transition being to an RRC connected state, performing the target operation using the machine-learning model at the network node;

based on the new machine-learning collaboration level being changed to a second level in response to the detected transition being to an RRC disconnected or idle state, performing the target operation using a machine-learning model at the user device and not at the network node; and based on the new machine-learning collaboration level being changed to a third level, terminating the target operation.

2. The method of claim 1, wherein the change information is further based on at least one of a type of the target operation, a time sensitivity of the target operation, and a criticality associated with the target operation.

3. The method of claim 1, wherein the first state is one of a RRC idle state or a RRC inactive state and the second state is a RRC connected state, and wherein the machine-learning collaboration level is based on one or more capabilities of the user device.

4. The method of claim 1, wherein the first state is a Radio Resource Control (RRC) connected state and the second state is one of a RRC idle state or a RRC inactive state, and wherein the change information comprises a new machine-learning collaboration level based on the transition.

5. The method of claim 1, wherein the first 5G new radio protocol is associated with radio resource control layer.

6. The method of claim 1, wherein based on the target operation being associated with a real-time application, information exchange is signaled using one or more physical layer protocols, information exchange comprising transmitting the first information and receiving the change information.

7. The method of claim 1, wherein based on the target operation being associated with a near real-time application, information exchange is signaled using one or more physical layer protocols, non-access stratum layer protocols, and radio resource control layer protocols, information exchange comprising transmitting the first information and receiving the change information.

8. The method of claim 1, wherein based on the target operation being associated with a non-real-time application, information exchange is signaled using one or more non-access stratum layer protocols and radio resource control layer protocols, information exchange comprising transmitting the first information and receiving the change information.

9. An apparatus for adaptive machine-learning related operation signaling in a telecommunication network, the apparatus comprising:

at least one memory configured to store program code; and at least one processor configured to read the program code and operate as instructed by the program code, the program code comprising:

detecting code configured to cause the at least one processor to detect a transition of the user device from a first state associated with a first 5G new radio protocol to a second state associated with the first 5G new radio protocol;

transmitting code configured to cause the at least one processor to transmit, in response to detecting the transition, first information associated with the transition, wherein the first information comprises a machine-learning collaboration level change request associated with the user device, the machine-learning collaboration level change request being a request to change a machine-learning collaboration level from among a plurality of predetermined machine-learning collaboration levels indicating whether or not a target operation is performed using a machine-learning model at a network node; and receiving code configured to cause the at least one processor to receive, in response to the transmitted first information, change information associated with the target operation, wherein the change information indicates the machine-learning collaboration level that varies based on the first information transmitted by the user device, wherein the target operation is performed based on the indicated machine-learning collaboration level, wherein the change information comprises at least one of an acknowledgement of the machine-learning collaboration level change request or a new machine-learning collaboration level based on the machine-learning collaboration level change request, and wherein the performing code further comprises:

based on the new machine-learning collaboration level being changed to a first level in response to the detected transition being to an RRC connected state, performing the target operation based using the machine-learning model at the network node;

based on the new machine-learning collaboration level being changed to a second level in response to the detected transition being to an RRC disconnected or idle state, performing the target operation using a machine-learning model at the user device and not at the network node; and based on the new machine-learning collaboration level being changed to a third level, terminating the target operation.

10. The apparatus of claim 9, wherein the change information is further based on at least one of a type of the target operation, a time sensitivity of the target operation, and a criticality associated with the target operation.

11. The apparatus of claim 9, wherein the first state is one of a RRC idle state or a RRC inactive state and the second state is a RRC connected state, and wherein the machine-learning collaboration level is based on one or more capabilities of the user device.

12. The apparatus of claim 9, wherein the first state is a Radio Resource Control (RRC) connected state and the second state is one of a RRC idle state or a RRC inactive state, and wherein the change information comprises a new machine-learning collaboration level based on the transition.

13. The apparatus of claim 9, wherein based on the target operation being associated with a real-time application, information exchange is signaled using one or more physical layer protocols, information exchange comprising transmitting the first information and receiving the change information.

14. The apparatus of claim 9, wherein based on the target operation being associated with a near real-time application, information exchange is signaled using one or more physical layer protocols, non-access stratum layer protocols, and radio resource control layer protocols, information exchange comprising transmitting the first information and receiving the change information.

15. A non-transitory computer-readable medium storing instructions for adaptive machine-learning related operation signaling in a telecommunication network, the instructions comprising: one or more instructions that, when executed by one or more processors, cause the one or more processors to:

detect, by user device, a transition of the user device from a first state associated with a first 5G new radio protocol to a second state associated with the first 5G new radio protocol;

in response to detecting the transition, transmit, by the user device, first information associated with the transition, wherein the first information comprises a machine-learning collaboration level change request associated with the user device, the machine-learning collaboration level change request being a request to change a machine-learning collaboration level from among a plurality of predetermined machine-learning collaboration levels indicating whether or not a target operation is performed using a machine-learning model at a network node;

receive, by the user device in response to the transmitted first information, change information associated with a target operation, wherein the change information indicates a machine-learning collaboration level that varies based on the first information transmitted by the user device; and perform, by the user device, the target operation based on the indicated machine-learning collaboration level, wherein the change information comprises at least one of an acknowledgement of the machine-learning collaboration level change request or a new machine-learning collaboration level based on the machine-learning collaboration level change request, and wherein performing the target operation based on the indicated machine-learning collaboration level comprises:

based on the new machine-learning collaboration level being changed to a first level in response to the detected transition being to an RRC connected state, performing the target operation using the machine-learning model at the network node;

based on the new machine-learning collaboration level being changed to a second level in response to the detected transition being to an RRC disconnected or idle state, performing the target operation using a machine-learning model at the user device and not at the network node; and based on the new machine-learning collaboration level being changed to a third level, terminating the target operation.

* * * * *